(12) United States Patent
Fan et al.

(10) Patent No.: US 11,513,711 B2
(45) Date of Patent: Nov. 29, 2022

(54) METHOD, DEVICE, AND PROGRAM PRODUCT FOR CREATING STRIPE BASED ON DYNAMIC WINDOW

(71) Applicant: EMC IP Holding Company LLC, Hopkinton, MA (US)

(72) Inventors: Huijuan Fan, Chengdu (CN); Chi Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/475,951

(22) Filed: Sep. 15, 2021

(65) Prior Publication Data

US 2022/0308775 A1    Sep. 29, 2022

(30) Foreign Application Priority Data

Mar. 23, 2021    (CN) .......................... 202110307472.1

(51) Int. Cl.
*G06F 12/00*    (2006.01)
*G06F 3/06*    (2006.01)

(52) U.S. Cl.
CPC .......... *G06F 3/0644* (2013.01); *G06F 3/0608* (2013.01); *G06F 3/0689* (2013.01)

(58) Field of Classification Search
CPC ..... G06F 3/0644; G06F 3/0608; G06F 3/0689
See application file for complete search history.

(56) References Cited

U.S. PATENT DOCUMENTS

| | | | |
|---|---|---|---|
| 8,429,514 B1 | 4/2013 | Goel | |
| 9,641,615 B1 | 5/2017 | Robins et al. | |
| 10,140,041 B1 | 11/2018 | Dong et al. | |
| 10,365,845 B1 * | 7/2019 | Foley | ...................... G06F 3/064 |
| 10,852,966 B1 | 12/2020 | Liu et al. | |

* cited by examiner

*Primary Examiner* — Shawn X Gu
(74) *Attorney, Agent, or Firm* — BainwoodHuang

(57) ABSTRACT

Techniques involve creating a stripe based on a dynamic window. In particular, in response to a request to create a stripe in the storage system, a first storage device for creating the stripe is selected from multiple storage devices. A first extent in the first storage device is added to the stripe. A first storage device sequence associated with the first storage device is determined based on a size of a predetermined window, and the first storage device sequence includes the first storage device and a set of continuous storage devices adjacent to the first storage device in the multiple storage devices. At least one other storage device for creating the stripe is determined based on storage devices other than the first storage device in the first storage device sequence. The storage devices in the storage system can be used in a balanced manner as much as possible.

20 Claims, 8 Drawing Sheets

METHOD, DEVICE, AND PROGRAM PRODUCT FOR CREATING STRIPE BASED ON DYNAMIC WINDOW

CROSS-REFERENCE TO RELATED APPLICATION

This application claims priority to Chinese Patent Application No. CN202110307472.1, on file at the China National Intellectual Property Administration (CNIPA), having a filing date of Mar. 23, 2021 and having "METHOD, DEVICE, AND PROGRAM PRODUCT FOR CREATING STRIPE BASED ON DYNAMIC WINDOW" as a title, the contents and teachings of which are herein incorporated by reference in their entirety.

TECHNICAL FIELD

Implementations of the present disclosure relate to storage management, and more particularly, to a method, a device, and a computer program product for creating a stripe in a storage system based on a dynamic window.

BACKGROUND

With the development of data storage technologies, various data storage devices have been capable of providing users with higher and higher data storage capacities. While data storage capabilities are improved, users also have increasingly high demands for data reliability and extendibility of storage systems. At present, various data storage systems based on Redundant Array of Independent Disks (RAID) have been developed to improve data reliability. When one or more disks in a storage system fail, data in the failed disks may be reconstructed from data on other normally operating disks.

A mapped RAID has been developed at present. In this mapped RAID, a disk is a logical concept and may include a plurality of extents. A plurality of extents included in a logical disk may be distributed on different physical storage devices in a storage system. For a plurality of extents in one stripe of the mapped RAID, the plurality of extents should be distributed on different physical storage devices, so that when a physical storage device where one of the plurality of extents is located fails, a reconstruction operation may be performed to recover data from physical storage devices where other extents are located.

To facilitate the management of a plurality of storage devices in a storage system, it has been currently proposed that the plurality of storage devices are divided into at least one group in accordance with a group threshold (including an upper limit threshold and a lower limit threshold). A stripe in a user storage system can be created based on each storage device in each group. Due to the limitation of the number of storage devices in a group, in some cases, it is not possible to group each storage device in the storage system into a corresponding group. Furthermore, the situation where usage loads of the storage devices in each group are severely unbalanced may occur. At this moment, how to create a stripe in a more effective manner and then use the storage spaces in each storage device as effectively as possible has become a technical problem.

SUMMARY OF THE INVENTION

Therefore, it is expected to develop and implement a technical solution for creating a stripe in a storage system in a more effective manner. It is desirable that the technical solution is compatible with existing storage systems, and by modifying various configurations of existing storage systems, storage devices may be managed in a more effective manner.

According to a first aspect of the present disclosure, a method for creating a stripe in a storage system which includes multiple storage devices is provided. In the method, in response to a request to create a stripe in the storage system, a first storage device for creating the stripe is selected from the multiple storage devices. A first extent in the first storage device is added to the stripe. A first storage device sequence associated with the first storage device is determined based on a size of a predetermined window, and the first storage device sequence includes the first storage device and a set of continuous storage devices adjacent to the first storage device in the multiple storage devices. At least one other storage device for creating the stripe is determined based on storage devices other than the first storage device in the first storage device sequence.

According to a second aspect of the present disclosure, an electronic device is provided. The electronic device includes: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and includes machine-executable instructions which are used for executing the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically shows a schematic diagram of a storage system according to a technical solution.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

Figure 1:
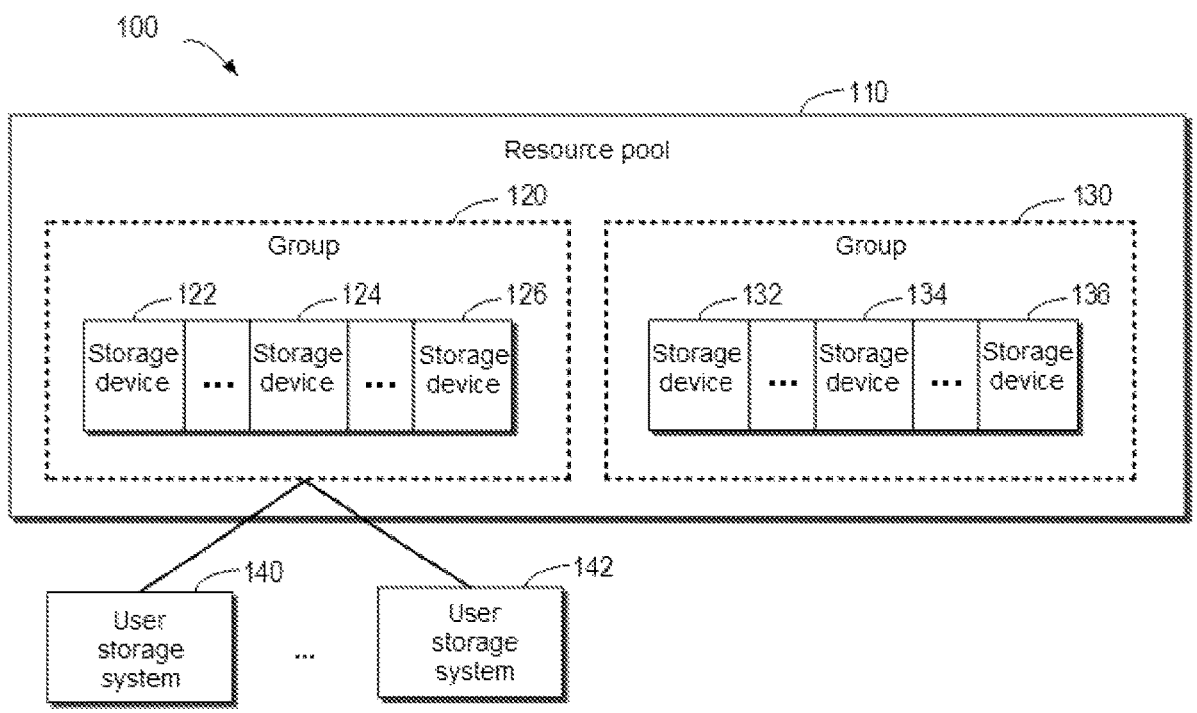

Firstly, an application environment of a storage system is described with reference to FIG. 1. FIG. 1 schematically shows a schematic diagram of storage system 100 according to a technical solution. As shown in FIG. 1, storage system 100 may include resource pool 110. Resource pool 110 may include a plurality of storage devices. To facilitate management, the plurality of storage devices can be divided into one or more groups. For example, storage devices 122, . . . , 124, . . . , and 126 may be grouped into group 120, and storage devices 132, . . . , 134, . . . , and 136 may be grouped into group 130.

Storage system 100 may be a RAID-based storage system. The RAID-based storage system may combine a plurality of storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are a plurality of standards for RAID, such as RAID-1, RAID-2, RAID-3, RAID-4, RAID-5, RAID-6, RAID-10, RAID-50, and so on.

Based on the mapped RAID technology, the storage space in each storage device in one group may be used to create a user storage system. For example, user storage systems 140, . . . , and 142 may be created based on the storage devices in group 120, respectively. At this moment, for one stripe in the user storage system, idle extents can only be selected from the storage devices in one group to create a stripe. In other words, multiple extents in one stripe can only come from one group and cannot span multiple groups.

It will be understood that the number of storage devices included in a group has a threshold range (for example, including an upper limit threshold and a lower limit threshold). In general, the upper limit threshold may be set to 64 or some other values, and the lower limit threshold may be determined based on the stripe width of the storage system and the number of backup storage devices required. For example, in a 4D+1P storage system with the stripe width of 4+1=5 and the number of backup storage devices of 1, the lower limit threshold can be determined based on the sum of the two: 5+1=6. At this moment, each group may include from 6 to 64 storage devices. When the number of storage devices included in resource pool 110 exceeds 64, multiple groups may exist.

It will be understood that the threshold range may cause many restrictions to the management of the storage system. For example, when the number of storage systems in resource pool 110 is expanded, a situation where a newly added storage system cannot be grouped into a certain group may occur. For another example, the situation where usage loads of the storage devices in each group are severely imbalanced may occur, which will cause serious imbalance in available storage spaces and service lives of the storage devices in the storage system, and so on.

Figure 2:
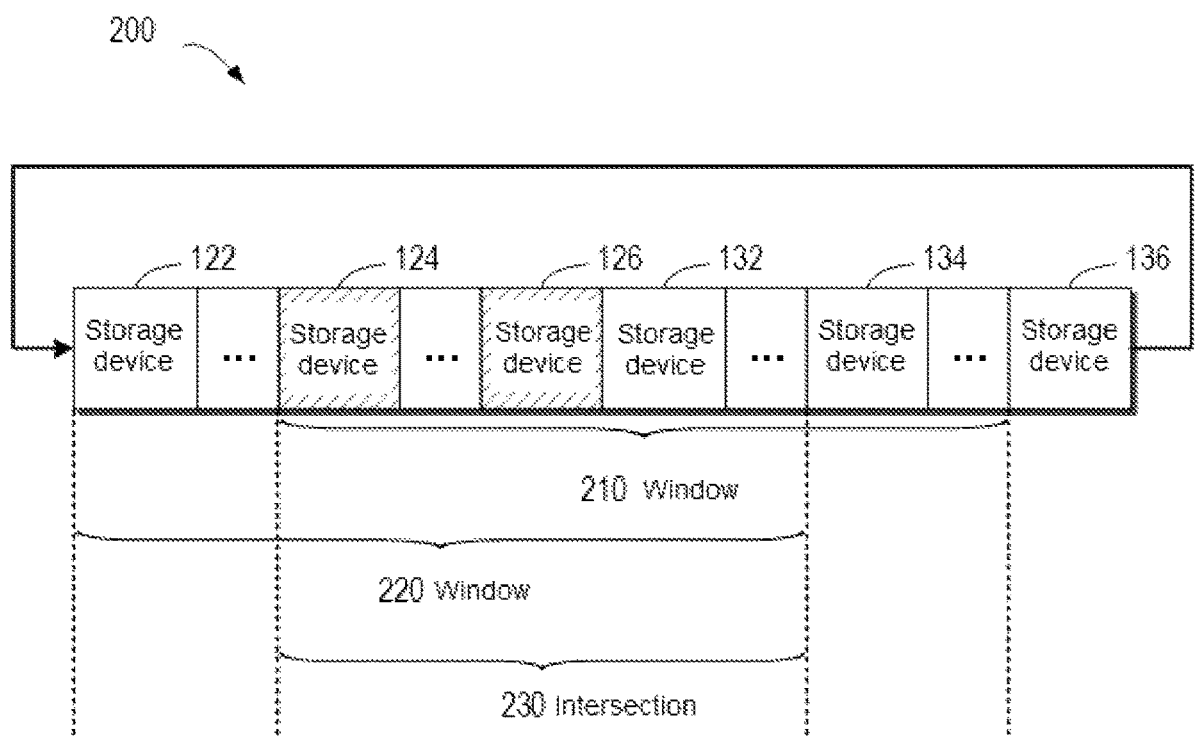
FIG. 2 schematically shows a block diagram of a process for creating a stripe based on a dynamic window according to an implementation of the present disclosure.

In order to at least partially solve the problems in the above technical solution, a technical solution of creating a stripe in a storage system based on a dynamic window is provided according to an example implementation of the present disclosure. A process according to an example implementation of the present disclosure will be described below in general with reference to FIG. 2. FIG. 2 schematically shows a block diagram of process 200 for creating a stripe based on a dynamic window according to an implementation of the present disclosure. As shown in FIG. 2, a storage device for creating a stripe can be selected based on a dynamic window (e.g., windows 210 and 220). According to an example implementation of the present disclosure, the concept of "group" in existing technical solutions is discarded, and an extent for creating a stripe can be selected from all storage devices in a resource pool (rather than storage devices in one group).

Only a 4D+1P storage system will be described below as an example. Extents in the stripe can be respectively selected in multiple rounds. In the first round, an idle extent in storage device 126 can be selected as a first extent in the stripe. Window 210 including storage device 126 may be determined, and window 210 may have a predetermined width. Then, based on a storage device in window 210 that is different from storage device 126, other storage devices for creating the stripe can be determined. In the second round, an idle extent in another storage device 124 can be selected as a second extent in the stripe. Furthermore, another window 220 including storage device 124 may be determined, and in a subsequent step, other storage devices for creating the stripe may be determined based on a storage device in intersection 230 of two windows.

By using an example implementation of the present disclosure, the group in existing storage systems is discarded, which can uniformly manage all storage devices in a storage system in a more flexible manner. It is possible to avoid the situation where not all storage devices can be divided into corresponding groups when the number of storage devices in the storage system changes. Furthermore, since the position of a window can change with the position of a previously selected storage device, the next storage device for creating the stripe can be selected from more storage devices in a more flexible manner. In this way, the imbalance of usage loads of the storage devices in the storage system can be avoided, and then the storage space in each storage device can be fully used.

Figure 3:
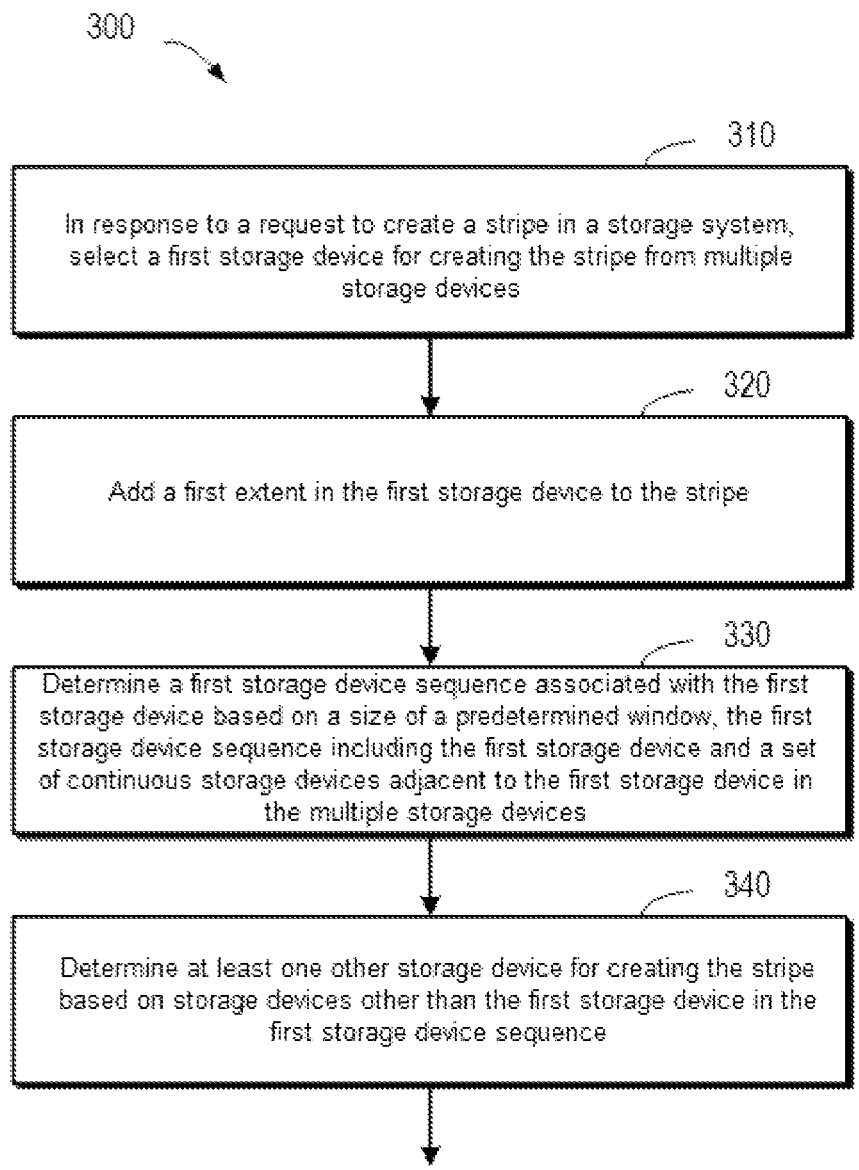
FIG. 3 schematically shows a flow chart of a method for creating a stripe based on a dynamic window according to an implementation of the present disclosure.

More details of an example implementation according to the present disclosure will be described below with reference to FIG. 3. FIG. 3 schematically shows a flow chart of method 300 for creating a stripe based on a dynamic window according to an implementation of the present disclosure. At block 310, in response to a request to create a stripe in storage system 110, a first storage device for creating the stripe is selected from multiple storage devices. In a 4D+1P storage system, a stripe includes 4+1=5 extents, so 5 storage devices need to be selected. At this moment, block 310 involves selecting a first storage device for creating the stripe from all storage devices in the storage system.

According to an example implementation of the present disclosure, the first storage device may be selected randomly. Alternatively and/or additionally, the first storage device may be selected from a plurality of storage devices in the storage system based on a correlation of each storage device. In order to ensure the workload balance of all storage devices, the concept of device correlation of a storage device is proposed. The device correlation of a specific storage device herein indicates the distribution of a set of stripes that have been created in the storage system between the specific storage device and storage devices other than the specific storage device.

When a request for creating a stripe in the storage system is received, a device correlation of a storage device in the plurality of storage devices can be determined. The device correlations and the storage devices herein may have a one-to-one corresponding relationship. For example, a device correlation of a storage device may be determined based on the distribution of a set of created stripes between the storage device and other storage devices. Similarly, the device correlation of the storage device may be determined, and a device correlation of each storage device may further be determined.

According to an example implementation of the present disclosure, a device correlation may be determined based on a correlation between two storage devices. The concept of a correlation between two storage devices is first introduced below. The 4D+1P RAID stripe includes 5 extents, and data in the 5 extents is usually accessed in association. This results in an increase in access volume of five storage devices respectively including the five extents. In summary, for any two storage devices, the more stripes the two storage devices serve together, the greater the possibility that the two storage devices are accessed simultaneously, and the higher the workloads of the two storage devices. Therefore, two storage devices should be prevented as much as possible from serving too many stripes at the same time.

For the ith storage device and the jth storage device (i≠j) in the plurality of storage devices, a correlation between the two storage devices can be expressed as $\gamma_{Disk\ i,\ Disk\ j}$. According to an example implementation of the present disclosure, the correlation of a storage device with respect to itself can be set to 0, that is, $\gamma_{Disk\ i,\ Disk\ i}=0$. As the storage system is used, some stripes will be created in the storage system. How to determine a correlation between storage devices will be described below with reference to FIG. 4.

Figure 4:
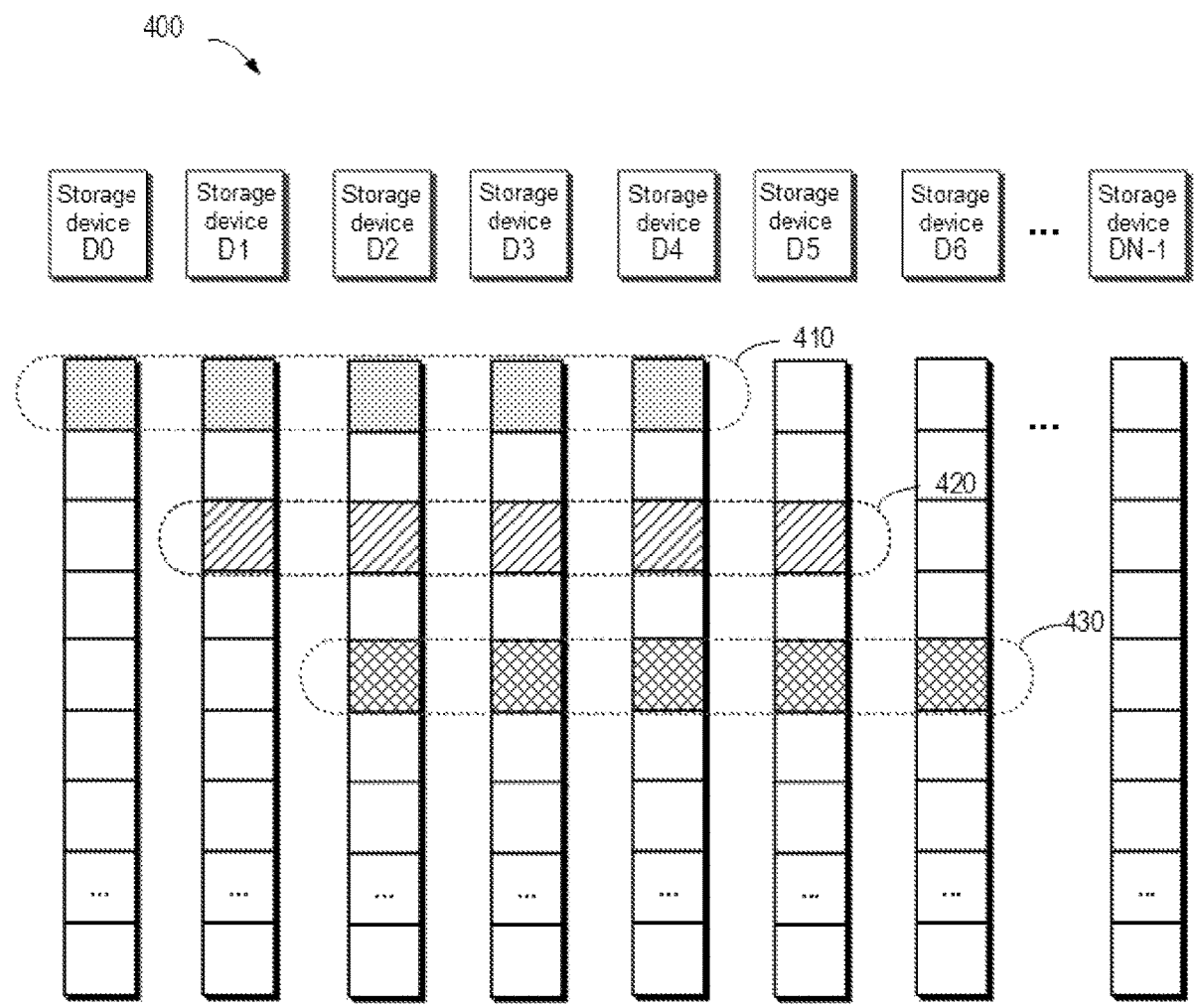
FIG. 4 schematically shows a block diagram of a process for determining a correlation between two storage devices according to an implementation of the present disclosure.

FIG. 4 schematically shows a block diagram of process 400 for determining a correlation between two storage devices according to an implementation of the present disclosure. As shown in FIG. 4, assume that the storage system includes N (N is a positive integer) storage devices D0 to DN−1. Three stripes 410, 420, and 430 have been created in the storage system, and the correlation $\gamma_{Disk\ i,Disk\ j}$ may be determined based on the number of stripes that jointly involve the ith storage device and the jth storage device. If it is expected to determine a correlation between storage device D0 and storage device D1 (i.e., i=0, j=1), it may be found that only stripe 410 uses extents in storage device D0 and storage device D1 at the same time, and thus $\gamma_{Disk\ 0,\ Disk\ 1}=1$.

For another example, if it is expected to determine a correlation between storage device D1 and storage device D2 (i.e., i=1, j=2), it may be found that stripe 410 uses extents in storage device D1 and storage device D2 at the same time, and stripe 420 also uses extents in storage device D1 and storage device D2 at the same time, and thus $\gamma_{Disk\ 1,\ Disk\ 2}=2$. Similarly, a correlation between any two storage devices in the plurality of storage devices may be determined. A mapping relationship between stripes and extents in the stripes may be conveniently obtained from the address mapping of the storage system. Thus, with the example implementation of the present disclosure, a correlation $\gamma_{Disk\ 1,\ Disk\ 2}$ between any two storage devices may be determined in a simple and effective manner.

According to an example implementation of the present disclosure, a device correlation of a specific storage device in the plurality of storage devices may be determined based on a correlation between two storage devices. Specifically, a correlation between the specific storage device and each of the storage devices other than the specific storage device may be determined respectively. Furthermore, the device correlation of the specific storage device may be determined based on the determined correlations.

According to an example implementation of the present disclosure, the device correlation may be set to be positively proportional to the correlation between the storage device and each of the other storage devices. For example, a sum of multiple correlations may be acquired, and the device correlation may be determined based on the summation operation. With the example implementation of the present disclosure, the device correlation of a specific storage device may be determined based on correlations between the specific storage device and other storage devices on the basis of simple mathematical operations. Assuming that it is expected to determine a device correlation of the ith storage device, a correlation between the ith storage device and another jth storage device (0≤j≤N−1, and i≠j) may be determined based on the method described above with reference to FIG. 4. According to an example implementation of the present disclosure, the device correlation $\gamma_{Disk\ i}$ of the ith storage device may be determined based on the following formula 1:

$$\gamma_{Disk\ i} = \sum_{j=0}^{N-1} \gamma_{Disk\ i,Disk\ j} \qquad \text{Formula 1}$$

where $\gamma_{Disk\ i}$ represents the device correlation of the ith storage device, $\gamma_{Disk\ i,\ Disk\ j}$ represents the correlation between the ith storage device and the jth storage device, and N represents the number of storage devices in the resource pool.

With the example implementation of the present disclosure, for the ith storage device, a device correlation $\gamma_{Disk\ i}$ of the device indicates a sum of correlations between the ith storage device and the other N−1 storage devices. In this case, the device correlation may accurately measure a degree of correlation between the ith storage device and the other storage devices, and may reflect a workload of the storage device. Selecting a storage device for creating a stripe based on the device correlation can accurately select a suitable storage device that helps achieve load balance based on the workloads of the storage devices.

It will be understood that formula 1 above only schematically shows a specific example for determining a device correlation. According to an example implementation of the present disclosure, other formulas may also be used to determine the device correlation. For example, the device correlation may be determined based on a product of a plurality of correlations. How to determine the device correlation $\gamma_{Disk\ i}$, of the ith storage device has been described above. After the device correlation of each storage device has been determined, a storage device can be selected from the plurality of storage devices based on the device correlations. When the device correlation of each storage device has been determined, the device correlations may be compared so as to select a first storage device from the plurality of storage devices.

According to an example implementation of the present disclosure, a storage device with a relatively low device correlation may be selected from the plurality of storage devices. Assuming that the device correlation $\gamma_{Disk\ i}$, of the ith storage device in the plurality of storage devices is smaller than the device correlation $\gamma_{Disk\ j}$ of the jth storage device in the plurality of storage devices, the ith storage device can be selected. With the example implementation of the present disclosure, a storage device with the lowest workload can be preferentially selected based on the device correlations, so that the created stripe can make the best use of a storage device in a better working state in the resource pool. According to an example implementation of the present disclosure, the device correlations of the storage devices may be compared, and an extent in a storage device with a minimum device correlation is selected as a first extent in the stripe. In this way, the stripe can be created by using an extent in a storage device with the lowest workload as much as possible.

Figure 5:
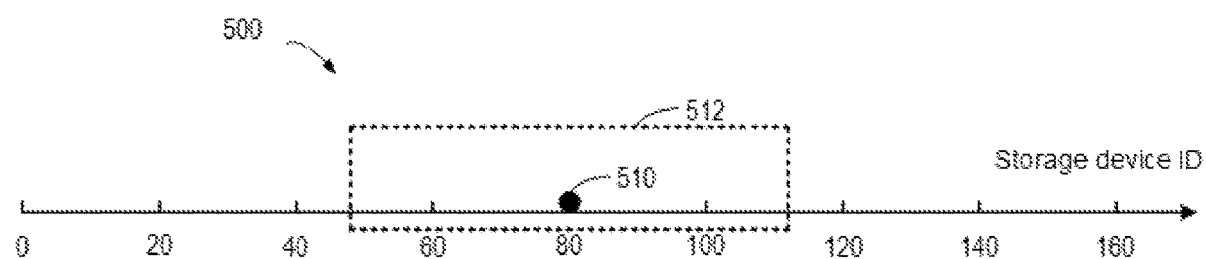
FIG. 5 schematically shows a block diagram of a dynamic window according to an implementation of the present disclosure.

The process of selecting a first storage device for creating a stripe has been described. In the following, return to FIG. 3 to describe subsequent operations for creating the stripe. At block 320, a first extent in the first storage device is added to the stripe. At this moment, an idle extent may be selected from the first storage device to create the stripe. The selected extent may be used as a first extent and added to the stripe. At block 330, a first storage device sequence associated with the first storage device is determined based on a size of a predetermined window. More details about the predetermined window will be described below with reference to FIG. 5. FIG. 5 schematically shows a block diagram of dynamic window 500 according to an implementation of the present disclosure. Assuming that the storage system includes 160 storage devices (i.e., storage devices D0 to D159), the coordinate axis shows the storage devices arranged in order, and the coordinate points show IDs of the storage devices. As shown in FIG. 5, the black dot represents a storage device selected for creating a stripe. At this moment, storage device 510 (D80) in the storage system is selected as a first storage device.

According to an example implementation of the present disclosure, a first sequence associated with the storage device can be determined based on the position of the first storage device (as shown in window 512), and the first storage device sequence here includes the first storage device and a set of continuous storage devices adjacent to the first storage device in the plurality of storage devices. The width of window 512 can be specified in advance. For example, the width of the window can be set based on a threshold upper limit of a group in an existing technical solution and/or other values. According to an example implementation of the present disclosure, the width of the window may be specified as 64 (or other values).

According to an example implementation of the present disclosure, the first storage device sequence may be determined based on the size of a predetermined window, so that the first storage device is close to the center of the first storage device sequence. For example, 32 storage devices can be selected from the left side of the first storage device, and 31 storage devices can be selected from the right side of the first storage device. In this case, the first storage device sequence will include 64 storage devices. In the example of FIG. 5, the first storage device sequence may include storage devices D48 to D111. For another example, 31 storage devices can be selected from the left side of the first storage device, and 32 storage devices can be selected from the right side of the first storage device.

It will be understood that although the above schematically shows that the storage device sequence is determined in a substantially symmetrical manner from both sides of the selected storage device, according to an example implementation of the present disclosure, the sliding range of window 512 can be specified to ensure that the sliding window includes a sufficient number of storage devices for creating a stripe. For example, 30 storage devices can be selected from the left side of a storage device, and 33 storage devices can be selected from the right side of the storage device. For another example, 29 storage devices can be selected from the left side of the storage device, and 34 storage devices can be selected from the right side of the storage device.

It will be understood that in a 4D+1P stripe, the stripe includes 5 extents. At this moment, after determining a first storage device sequence associated with a first storage device, it is necessary to select 4 subsequent storage devices based on an intersection of the first storage device sequence and other storage device sequences. Therefore, it should be ensured that in extreme cases (every time a storage device located at the edge of the intersection is selected), at least one storage device is included in the intersection when the last storage device is selected. Therefore, the sliding range of a window should be greater than or equal to 5−1=4. That is, when determining a first storage device sequence, the distance between the edge of a window and a first storage device should be greater than or equal to 4.

According to an example implementation of the present disclosure, for a stripe with a width of M, when determining a storage device sequence associated with each selected storage device, it should be ensured that the distance between the edge of a window and the selected storage device is greater than or equal to M−1. It will be understood that the edge of a window here includes the left and right edges of the window. That is, in extreme cases, a storage device sequence may include: M−1 storage devices on the left (or right) side of a selected storage device and 64−(M−1)−1 storage devices on the right (or left) side of the selected storage device. With the example implementation of the present disclosure, it can be ensured that when the last extent in a stripe is determined, at least one storage device is included in the intersection of storage device sequences.

According to an example implementation of the present disclosure, in order to ensure that storage device sequences can be determined in a continuous manner, a plurality of storage devices may be arranged in a ring manner. It will be understood that if the number of multiple storage devices in a storage system is less than an upper limit threshold (e.g., 64), no matter how a window slides at this moment, the multiple storage devices will be within the same group threshold range. If the number of the multiple storage devices is greater than the upper limit threshold, the sliding of the window will allow more storage devices to be used to create stripes, thereby improving the use efficiency and balance of the storage system.

In the case where a first storage device sequence has been determined, other extents in a stripe may be created based on other storage devices in the first storage device sequence. Returning to FIG. 3, at block 340 of FIG. 3, at least one other storage device for creating the stripe is determined based on storage devices other than the first storage device in the first storage device sequence. It will be understood that based on the principle of RAID, each extent in a stripe should come from a different storage device. Therefore, at this moment, it is necessary to select from the first storage device sequence a storage device that has not been selected.

According to an example implementation of the present disclosure, a second storage device for creating the stripe may be selected from other storage devices. For example, the second storage device may be selected from other storage devices based on a random manner. Alternatively and/or additionally, in order to ensure the performance of the stripe, the second storage device can be selected based on a stripe correlation. Herein, a stripe correlation describes a correlation between one storage device and a plurality of storage devices where one stripe is located. A higher stripe correlation indicates a closer relationship between the storage device and the stripe. For example, a stripe correlation $\gamma_{Disk\ i,\ RE\ k}$ between the ith storage device and the kth stripe may be determined based on the following formula 2.

$$\gamma_{Disk\ i, REk} = \sum_{Disk\ j \in REk} \gamma_{Disk\ i, Disk\ j} \quad \text{Formula 2}$$

where $\gamma_{Disk\ i,\ RE\ k}$ represents the stripe correlation between the ith storage device and the kth stripe, $\gamma_{Disk\ i,\ Disk\ j}$ represents the correlation between the ith storage device and the jth storage device, and the jth storage device represents various storage devices including extents in the kth stripe. With the example implementation of the present disclosure, the correlations between a storage device and storage devices where all the extents in the stripe are located can reflect degrees of closeness between the storage device and all storage devices involved in the stripe. A degree of closeness between a device and a stripe can be determined in a simple and effective way by summing multiple correlations.

It will be understood that since multiple extents in the stripe need to be located in different storage devices, the stripe needs to be created by selecting extents from other storage devices not involved in the stripe. At this moment, a set of storage devices involved in the stripe and a set of storage devices not involved in the stripe can be determined. In an initial stage of creation of the stripe, the stripe includes only an extent in a first storage device. The subsequent second, third, fourth, and fifth extents may be determined step by step. According to an example implementation of the present disclosure, when selecting the second to fifth storage devices for creating a stripe, the stripe correlation between each candidate storage device and the current stripe can be firstly determined, and a storage device with a low (or the lowest) stripe correlation is preferentially selected.

According to an example implementation of the present disclosure, a second extent in the second storage device may be added to the stripe. Furthermore, it can be determined whether the number of extents in the current stripe reaches a predetermined width of the stripe. If the number of extents in the stripe is lower than the predetermined width of the stripe, the next storage device for creating the stripe is determined based on the storage device sequences respectively associated with the extents in the stripe. In other words, the storage device sequences of all extents in the stripe can be determined respectively, and the determined storage device sequences can be used to determine the next storage device.

According to an example implementation of the present disclosure, the intersection of the storage device sequences respectively associated with the extents in the stripe can be determined, and the next storage device can be selected from other storage devices in the intersection that are different from the storage devices where the extents in the stripe are located. For example, any storage device may be selected from the intersection based on a random manner, and for another example, the storage device with the minimum stripe correlation may be selected from the intersection based on the stripe correlation described above.

According to an example implementation of the present disclosure, for a first set of storage devices in the intersection which do not include any extent in the stripe, a stripe correlation between a given storage device in the first set of storage devices and the stripe can be determined. According to an example implementation of the present disclosure, it is expected that an overall correlation between storage devices where extents in the created stripe are located is as small as possible, and thus an extent in a storage device with a small stripe correlation can be preferentially selected. Furthermore, one idle extent in the selected storage device may be added to the stripe. With the example implementation of the present disclosure, each time the next extent in the stripe is selected, an extent in a storage device with a small correlation can be selected in a simple and effective way by using the stripe correlations. In this way, storage devices that are more distantly related to one or more storage devices involved in the current stripe can be used as much as possible, so that the stripe can run with high performance.

For convenience of description, a symbol $\gamma_{Disk\ i,\ RE\ current}$ may be used to represent the stripe correlation between the ith storage device and the current stripe, where RE current indicates a storage device where an extent in the current stripe is located. In order to determine a second extent in the stripe, a storage device with the minimum stripe correlation can be selected.

It will be understood that since the number of extents in a stripe is determined by the width of the stripe, the above steps can be repeated while the number of extents in the stripe is lower than the width of the stripe. According to an example implementation of the present disclosure, the width of the stripe may be determined first, and it is determined, based on comparison between the number of extents in the current stripe and the width, whether a selection step is to be performed. Specifically, if the number of extents is lower than the width of the stripe, the next extent is selected; otherwise, the selection operation is stopped. In order to select one or more subsequent extents, a stripe correlation between each selectable storage device and the current stripe can be continuously determined based on formula 2 above, and then an idle extent in a storage device with the minimum stripe correlation can be selected.

With the example implementation of the present disclosure, each extent in the stripe can be determined one by one only through simple mathematical calculation. In this way, it can be ensured that an extent in a storage device that is most conducive to achieving load balancing is selected each time from a plurality of storage devices to create a stripe.

Selection of one or more subsequent extents based on a stripe correlation has been described above. According to an example implementation of the present disclosure, the storage device may also be selected based on both the stripe correlation and the device correlation of the storage device. It will be understood that a plurality of extents in a stripe will be accessed in association, and selecting a storage device based on the stripe correlation may consider the interaction between all storage devices in the created stripe. In a subsequent operation process, the performance of the storage device may also be affected by a correlation between the storage device and another storage device (i.e., device correlation). Therefore, the storage device can be selected based on both the stripe correlation and the device correlation. With the example implementation of the present disclosure, the factors in the above two aspects can be fully considered to improve the overall performance of the storage system.

According to an example implementation of the present disclosure, a combined correlation between the ith storage device and the current stripe may be determined based on formula 3 $\gamma'_{Disk\ i,\ RE\ k}$.

$$\gamma'_{Disk\ i, RE\ current} = \gamma_{Disk\ i, RE\ current} + \gamma_{Disk\ i} \quad \text{Formula 3}$$

where $\gamma'_{Disk\ i,\ RE\ current}$ denotes the combined correlation between the ith storage device and the current stripe $\gamma_{Disk\ i,\ RE\ current}$ denotes the stripe correlation between the ith storage device and the current stripe, and $\gamma_{Disk\ i}$ denotes the device correlation of the ith storage device. It will be understood that formula 3 is merely a specific example for calculating a combined correlation, and other formulas may be used to determine the combined correlation according to an example implementation of the present disclosure. For example, the combined correlation may be determined based on a product of the stripe correlation and the device correlation.

The foregoing has described how to determine a stripe correlation between each storage device in the intersection and the current stripe based on formula 2 and formula 3. According to an example implementation of the present disclosure, the stripe correlations of the storage devices that can be used to create a stripe may be determined based on formula 2 or 3, and then a storage device with a low (the lowest) stripe correlation can be selected to create the stripe.

Figure 6A:
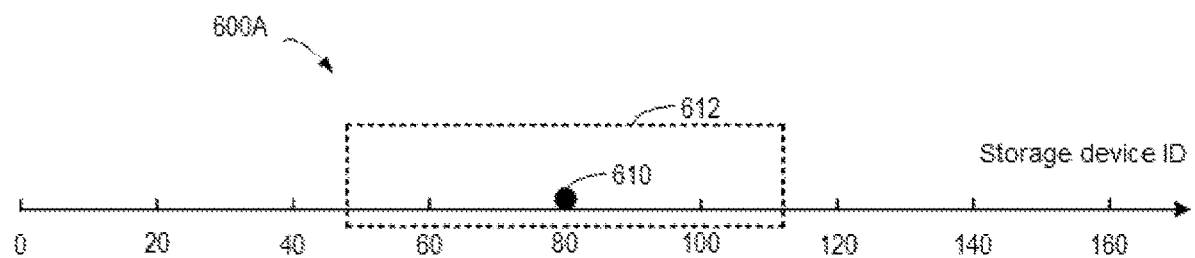
FIGS. 6A-6E schematically show block diagrams of a process for selecting each extent in a stripe according to an implementation of the present disclosure.

The process for determining each extent in a stripe has been described above. How to determine the first extent to the fifth extent in the stripe will be described below with reference to FIGS. 6A-6E respectively. FIG. 6A schematically shows a block diagram of process 600A for selecting a first extent in a stripe according to an implementation of the present disclosure. Assume storage device 610 (D80) is selected based on a device correlation. At this moment, the range of storage device sequence 612 associated with storage device 610 can be determined as: storage devices D48 to D111 (32 storage devices selected from the left side of storage device 610 and 31 storage devices selected from the right side of storage device 610). At this moment, storage devices for creating a stripe include: storage device D80.

Figure 6B:
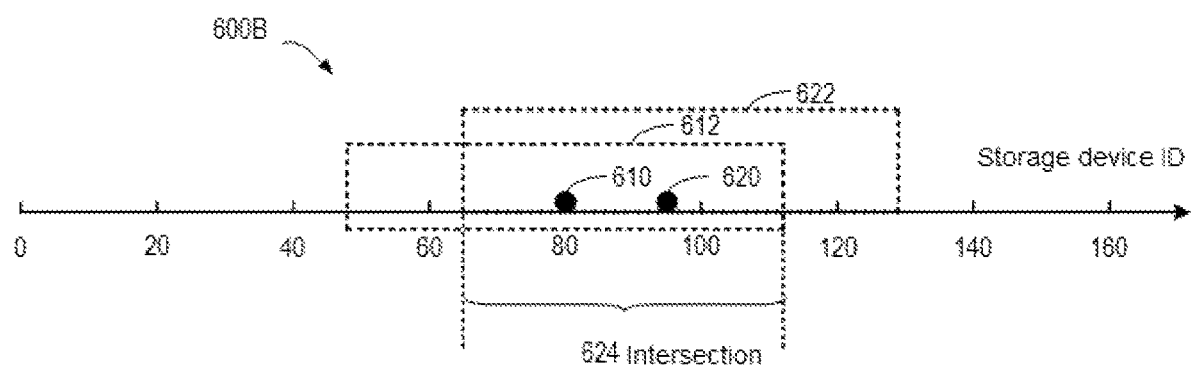

FIG. 6B schematically shows a block diagram of process 600B for selecting a second extent in the stripe according to an implementation of the present disclosure. The storage device (different from storage device 610) for providing the second extent can be selected from storage device sequence 612 based on the method described above. Assuming that storage device 620 (D96) is selected, the range of storage device sequence 622 associated with storage device 620 can be determined as: D64 to D127. At this moment, intersection 624 of two storage device sequences 612 and 622 includes: D64 to D111; and the storage devices for creating a stripe include: D80 and D96.

Figure 6C:
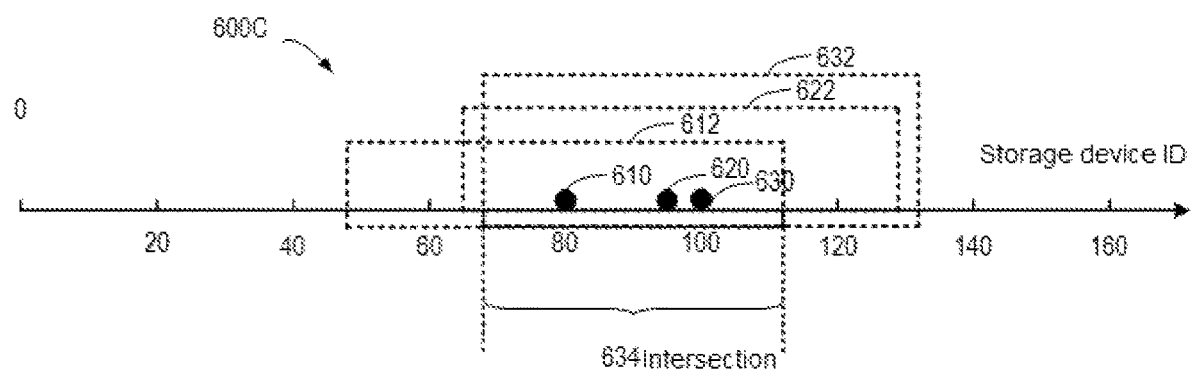

FIG. 6C schematically shows a block diagram of process 600C for selecting a third extent in the stripe according to an implementation of the present disclosure. The storage device (different from storage devices 610 and 620) for providing the third extent can be selected from intersection 624 based on the method described above. Assuming that storage device 630 (D100) is selected, the range of storage device sequence 632 associated with storage device 630 can be determined as: D68 to D131. At this moment, intersection 634 of three storage device sequences 612, 622, and 632 includes: D68 to D111; and the storage devices for creating a stripe include: D80, D96, and D100.

Figure 6D:
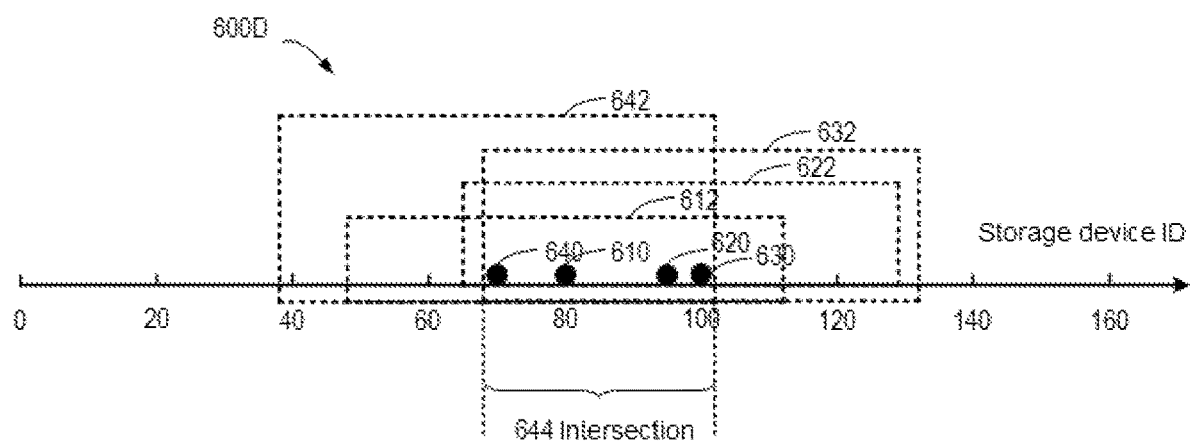

FIG. 6D schematically shows a block diagram of process 600D for selecting a fourth extent in the stripe according to an implementation of the present disclosure. The storage device (different from storage devices 610, 620, and 630) for providing the fourth extent can be selected from intersection 634 based on the method described above. Assuming that storage device 640 (D70) is selected, the range of storage device sequence 642 associated with storage device 640 can be determined as: D38 to D101. At this moment, intersection 644 of fourth storage device sequences 612, 622, 632, and 642 includes: D68 to D101; and the storage devices for creating a stripe include: D80, D96, D100, and D70.

Figure 6E:
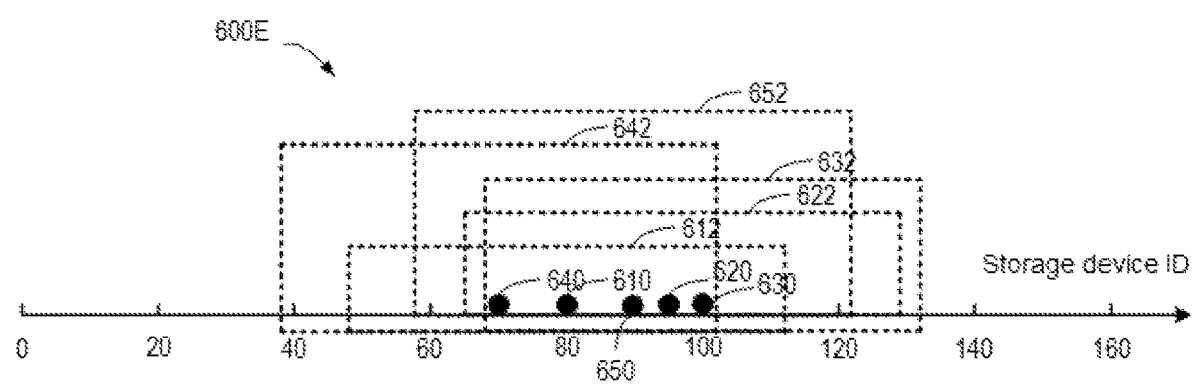

FIG. 6E schematically shows a block diagram of process 600E for selecting a fifth extent in the stripe according to an implementation of the present disclosure. The storage device (different from storage devices 610, 620, 630, and 640) for providing the fifth extent can be selected from intersection 644 based on the method described above. Assume that storage device 650 (D90) is selected. At this moment, five storage devices for creating a stripe have been selected: storage devices D80, D96, D100, D70, and D90. With the example implementation of the present disclosure, five storage devices for creating a stripe may be selected in a convenient and effective manner. At this moment, compared with creating a stripe in a group in an existing technical solution, locations of the storage devices in the stripe created by the process shown in FIGS. 6A-6E are no longer limited to one group, thereby ensuring the workload balance of storage devices in the storage system.

According to an example implementation of the present disclosure, one or more stripes may be created based on the number of stripes included in a user storage system. If another request to create another stripe in the storage system is received, a storage device for creating the another stripe can be selected from storage devices other than the first storage device sequence in a plurality of storage devices. In this way, the stripes in the user storage system can be distributed as far as possible in storage devices that span a larger location range, thereby making the workloads of the storage devices as balanced as possible.

For example, when creating a first stripe, the range of the first storage device sequence includes: D48 to D111. When creating a second stripe, a plurality of storage devices for creating the second stripe can be selected as much as possible from storage devices other than the first storage device sequence. For example, D0 can be selected as the first storage device for creating the second stripe. At this moment, the storage device sequence associated with the first storage device in the second stripe will include D128 to D31. At this moment, the extents in the second stripe will be from D128 to D31. When creating a subsequent stripe, a storage device that is not included in the storage device sequence of the previous stripe may be taken as much as possible as the first storage device of the subsequent stripe.

With the example implementation of the present disclosure, as the number of stripes in the storage system increases, usage loads of the storage devices will remain evenly distributed in the entire storage system. In this way, uneven usage loads of storage devices caused in an existing storage system that creates stripes based on groups will be avoided.

Examples of the method according to the present disclosure have been described in detail above with reference to FIG. 2 to FIG. 6, and implementations of a corresponding apparatus will be described below. According to an example implementation of the present disclosure, an apparatus for creating a stripe in a storage system that includes multiple storage devices is provided. The apparatus includes: a selecting module configured to, in response to a request to create a stripe in the storage system, select a first storage device for creating the stripe from the multiple storage devices; an adding module configured to add a first extent in the first storage device to the stripe; a sequence determining module configured to determine a first storage device sequence associated with the first storage device based on a size of a predetermined window, the first storage device sequence including the first storage device and a set of continuous storage devices adjacent to the first storage device in the multiple storage devices; and a device determining module configured to determine at least one other storage device for creating the stripe based on storage devices other than the first storage device in the first storage device sequence. According to an example implementation of the present disclosure, the apparatus further includes modules for performing other steps in the method described above.

Figure 7:
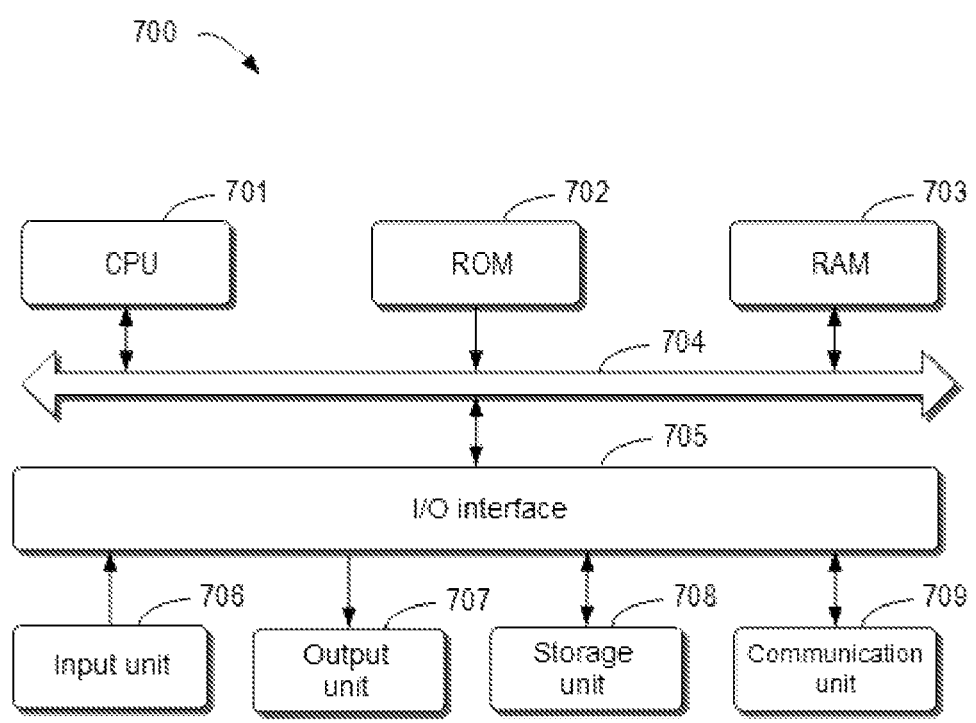
FIG. 7 schematically shows a block diagram of a device for managing stripes based on a dynamic window according to an implementation of the present disclosure.

FIG. 7 schematically shows a block diagram of device 700 for managing stripes based on a dynamic window according to an example implementation of the present disclosure. As shown in the figure, device 700 includes central processing unit (CPU) 701 that may perform various appropriate actions and processing according to computer program instructions stored in read-only memory (ROM) 702 or computer program instructions loaded from storage unit 708 into random access memory (RAM) 703. In RAM 703, various programs and data required for the operation of device 700 may also be stored. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above, such as method 300, may be performed by processing unit 701. For example, in some implementations, method 300 may be implemented as a computer software program that is tangibly included in a machine-readable medium, such as storage unit 708. In some implementations, part or all of the computer program may be loaded and/or installed onto device 700 via ROM 702 and/or communication unit 709. One or more steps of method 300 described above may be performed when the computer program is loaded into RAM 703 and executed by CPU 701. Alternatively, in other implementations, CPU 701 may also be configured in any other suitable manner to implement the above processes/methods.

According to an example implementation of the present disclosure, an electronic device is provided, which includes: at least one processor; and a memory coupled to the at least one processor and having instructions stored therein which, when executed by the at least one processor, cause the device to perform a method for creating a stripe in a storage system that includes multiple storage devices. The method includes: in response to a request to create a stripe in a storage system, selecting a first storage device for creating the stripe from the multiple storage devices; adding a first extent in the first storage device to the stripe; determining a first storage device sequence associated with the first storage device based on a size of a predetermined window, the first storage device sequence including the first storage device and a set of continuous storage devices adjacent to the first storage device in the multiple storage devices; and determining at least one other storage device for creating the stripe based on storage devices other than the first storage device in the first storage device sequence.

According to an example implementation of the present disclosure, determining the at least one other storage device includes: selecting a second storage device for creating the stripe from the other storage devices; adding a second extent in the second storage device to the stripe; and in response to determining that the number of extents in the stripe is lower than a predetermined width of the stripe, determining the next storage device for creating the stripe based on storage device sequences respectively associated with the extents in the stripe.

According to an example implementation of the present disclosure, determining the next storage device includes: determining an intersection of the storage device sequences respectively associated with the extents in the stripe; and selecting the next storage device from storage devices in the intersection other than those where the extents in the stripe are located.

According to an example implementation of the present disclosure, selecting the next storage device includes: for a first set of storage devices in the intersection which do not include any extent in the stripe, determining a stripe correlation between a given storage device in the first set of storage devices and the stripe; and selecting the next storage device from the first set of storage devices based on the determined stripe correlation.

According to an example implementation of the present disclosure, determining the stripe correlation between the given storage device and the stripe includes: determining, in the intersection, a second set of storage devices that respectively include the extents in the stripe; and determining the stripe correlation between the given storage device and the stripe based on a correlation between the given storage device and each storage device in the second set of storage devices.

According to an example implementation of the present disclosure, selecting the next storage device from the first set of storage devices based on the determined stripe correlation includes: selecting the next storage device based on the stripe correlation and a device correlation of the next storage device.

According to an example implementation of the present disclosure, selecting the first storage device from the multiple storage devices includes: determining a device correlation of a storage device in the multiple storage devices, the device correlation indicating the distribution of a set of stripes which have been created in the storage system between the storage device and other storage devices than the storage device; and selecting the first storage device from the multiple storage devices based on the determined device correlation.

According to an example implementation of the present disclosure, determining the first storage device sequence associated with the first storage device based on the size of the predetermined window includes: determining the first storage device sequence based on the size of the predetermined window so that the first storage device is close to the center of the first storage device sequence.

According to an example implementation of the present disclosure, the method further includes: in response to receiving another request to create another stripe in the storage system, selecting a storage device for creating the another stripe from storage devices other than the first storage device sequence in the multiple storage devices.

According to an example implementation of the present disclosure, the multiple storage devices are arranged in a ring manner, the stripe is a stripe in a redundant array of independent disks, the number of the multiple storage devices is greater than a threshold upper limit of the number of storage devices included in a group for forming the redundant array of independent disks, and the size of the predetermined window is determined based on the threshold upper limit.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium has machine-executable instructions stored thereon, and when executed by at least one processor, the machine-executable instructions cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, the programming languages including object-oriented programming languages, such as Smalltalk and C++, as well as conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for creating a stripe in a storage system comprising multiple storage devices, the method comprising:

in response to a request to create a stripe in the storage system, selecting a first storage device for creating the stripe from the multiple storage devices;

adding a first extent in the first storage device to the stripe;

determining a first storage device sequence associated with the first storage device based on a size of a predetermined window, the first storage device sequence comprising the first storage device and a set of continuous storage devices adjacent to the first storage device in the multiple storage devices; and determining at least one other storage device for creating the stripe based on storage devices other than the first storage device in the first storage device sequence.

2. The method according to claim 1, wherein determining the at least one other storage device comprises:

selecting a second storage device for creating the stripe from the other storage devices;

adding a second extent in the second storage device to the stripe; and in response to determining that a number of extents in the stripe is lower than a predetermined width of the stripe, determining a next storage device for creating the stripe based on storage device sequences respectively associated with the extents in the stripe.

3. The method according to claim 2, wherein determining the next storage device comprises:

determining an intersection of the storage device sequences respectively associated with the extents in the stripe; and selecting the next storage device from storage devices in the intersection other than those where the extents in the stripe are located.

4. The method according to claim 3, wherein selecting the next storage device comprises:

for a first set of storage devices in the intersection which do not comprise any extent in the stripe, determining a stripe correlation between a given storage device in the first set of storage devices and the stripe; and selecting the next storage device from the first set of storage devices based on the determined stripe correlation.

5. The method according to claim 4, wherein determining the stripe correlation between the given storage device and the stripe comprises:

determining, in the intersection, a second set of storage devices that respectively comprise the extents in the stripe; and determining the stripe correlation between the given storage device and the stripe based on a correlation between the given storage device and each storage device in the second set of storage devices.

6. The method according to claim 4, wherein selecting the next storage device in the first set of storage devices based on the determined stripe correlation comprises: selecting the next storage device based on the stripe correlation and a device correlation of the next storage device.

7. The method according to claim 1, wherein selecting the first storage device from the multiple storage devices comprises:

determining a device correlation of a storage device in the multiple storage devices, wherein the device correlation indicates the distribution of a set of stripes which have been created in the storage system between the storage device and other storage devices than the storage device; and selecting the first storage device from the multiple storage devices based on the determined device correlation.

8. The method according to claim 1, wherein determining the first storage device sequence associated with the first storage device based on a size of a predetermined window comprises: determining the first storage device sequence based on the size of the predetermined window so that the first storage device is close to the center of the first storage device sequence.

9. The method according to claim 1, wherein the method further comprises: in response to receiving another request to create another stripe in the storage system, selecting a storage device for creating the another stripe from storage devices other than the first storage device sequence in the multiple storage devices.

10. The method according to claim 1, wherein the multiple storage devices are arranged in a ring manner, the stripe is a stripe in a redundant array of independent disks, the number of the multiple storage devices is greater than a threshold upper limit of the number of storage devices comprised in a group for forming the redundant array of independent disks, and the size of the predetermined window is determined based on the threshold upper limit.

11. An electronic device, comprising:
at least one processor; and
a memory coupled to the at least one processor, wherein the memory has instructions stored therein which, when executed by the at least one processor, cause the device to perform a method for creating a stripe in a storage system comprising multiple storage devices, the method comprising:
in response to a request to create a stripe in the storage system, selecting a first storage device for creating the stripe from the multiple storage devices;
adding a first extent in the first storage device to the stripe;
determining a first storage device sequence associated with the first storage device based on a size of a predetermined window, the first storage device sequence comprising the first storage device and a set of continuous storage devices adjacent to the first storage device in the multiple storage devices; and
determining at least one other storage device for creating the stripe based on storage devices other than the first storage device in the first storage device sequence.

12. The device according to claim 11, wherein determining the at least one other storage device comprises:
selecting a second storage device for creating the stripe from the other storage devices;
adding a second extent in the second storage device to the stripe; and
in response to determining that a number of extents in the stripe is lower than a predetermined width of the stripe, determining a next storage device for creating the stripe based on storage device sequences respectively associated with the extents in the stripe.

13. The device according to claim 12, wherein determining the next storage device comprises:
determining an intersection of the storage device sequences respectively associated with the extents in the stripe; and
selecting the next storage device from storage devices in the intersection other than those where the extents in the stripe are located.

14. The device according to claim 13, wherein selecting the next storage device comprises:
for a first set of storage devices in the intersection which do not comprise any extent in the stripe, determining a stripe correlation between a given storage device in the first set of storage devices and the stripe; and
selecting the next storage device from the first set of storage devices based on the determined stripe correlation.

15. The device according to claim 14, wherein determining the stripe correlation between the given storage device and the stripe comprises:
determining, in the intersection, a second set of storage devices that respectively comprise the extents in the stripe; and
determining the stripe correlation between the given storage device and the stripe based on a correlation between the given storage device and each storage device in the second set of storage devices.

16. The device according to claim 14, wherein selecting the next storage device in the first set of storage devices based on the determined stripe correlation comprises: selecting the next storage device based on the stripe correlation and a device correlation of the next storage device.

17. The device according to claim 11, wherein selecting the first storage device from the multiple storage devices comprises:
determining a device correlation of a storage device in the multiple storage devices, wherein the device correlation indicates the distribution of a set of stripes which have been created in the storage system between the storage device and other storage devices than the storage device; and
selecting the first storage device from the multiple storage devices based on the determined device correlation.

18. The device according to claim 11, wherein determining the first storage device sequence associated with the first storage device based on a size of a predetermined window comprises: determining the first storage device sequence based on the size of the predetermined window so that the first storage device is close to the center of the first storage device sequence.

19. The device according to claim 11, wherein the method further comprises: in response to receiving another request to create another stripe in the storage system, selecting a storage device for creating the another stripe from storage devices other than the first storage device sequence in the multiple storage devices.

20. A computer program product having a non-transitory computer readable medium which stores a set of instructions to create a stripe in a storage system that includes multiple storage devices; the set of instructions, when carried out by computerized circuitry, causing the computerized circuitry to perform a method of:
in response to a request to create a stripe in the storage system, selecting a first storage device for creating the stripe from the multiple storage devices;
adding a first extent in the first storage device to the stripe;
determining a first storage device sequence associated with the first storage device based on a size of a predetermined window, the first storage device sequence comprising the first storage device and a set of continuous storage devices adjacent to the first storage device in the multiple storage devices; and
determining at least one other storage device for creating the stripe based on storage devices other than the first storage device in the first storage device sequence.

* * * * *